United States Patent [19]

Maionchi

[11] Patent Number: 5,165,265

[45] Date of Patent: Nov. 24, 1992

[54] TRAILER SECURITY LOCK APPARATUS

[76] Inventor: Alvin Maionchi, 8729 Rubia Dr., Elk Grove, Calif. 95624

[21] Appl. No.: 837,940

[22] Filed: Feb. 20, 1992

[51] Int. Cl.⁵ .................................... F16B 41/00
[52] U.S. Cl. .................... 70/232; 280/507; 280/433; 248/352; 70/258; 70/14
[58] Field of Search ............... 70/231, 232, 229, 424, 70/428, 14, 19, 62, 258; 280/507, 433, 475; 248/352, 552

[56] References Cited

U.S. PATENT DOCUMENTS

| | | | |
|---|---|---|---|
| 2,785,564 | 3/1957 | Rossi | 70/232 |
| 3,321,169 | 5/1967 | Fowler | 248/352 |
| 3,415,085 | 12/1968 | Eble, Jr. | 70/232 |
| 3,574,363 | 4/1971 | Stephenson | 280/433 |
| 3,844,143 | 10/1974 | Hudson | 70/232 |
| 3,982,413 | 9/1976 | Stone et al. | 70/229 |
| 4,141,233 | 2/1979 | Reyes | 70/232 |
| 4,730,841 | 3/1988 | Ponder | 70/258 |
| 4,876,867 | 10/1989 | Leneave | 70/428 |
| 4,905,953 | 3/1990 | Wilson | 248/352 |
| 5,052,203 | 10/1991 | Van Cuyk | 70/232 |

FOREIGN PATENT DOCUMENTS 1206333  9/1970  United Kingdom ............... 70/14

Primary Examiner—Renee S. Luebke
Assistant Examiner—D. Boucher
Attorney, Agent, or Firm—Leon Gilden

[57] ABSTRACT

A trailer lock structure is arranged for use by fifth wheel trailers, wherein a mounting plate is fixedly secured to a trailer bottom wall forward end to receive fifth wheel securement linkage within a cylindrical tube mounted orthogonally to the mounting plate extending therethrough. A latch plate is pivotally mounted to the cylindrical tube directed through a slot of the cylindrical tube and latched to effect an abutment within the cylindrical tube permitting undesirable removal over mounting of the structure to unauthorized individuals and associated vehicles. The use of support leg tubes for selectively receiving support legs therewithin permits the stable support of a forward end of an associated trailer.

5 Claims, 4 Drawing Sheets

5,165,265

TRAILER SECURITY LOCK APPARATUS

BACKGROUND OF THE INVENTION

1. Field of the Invention

The field of invention relates to trailer apparatus, and more particularly pertains to a new and improved trailer security lock apparatus arranged for the prevention of inadvertent and unauthorized removal and securement of a fifth wheel trailer to an unauthorized vehicle.

2. Description of the Prior Art

When trailers known as fifth wheels are removed relative to tow vehicles, they are accordingly left subject to theft and removal. To prevent such practice, various lock structures have been utilized in the prior art relative to the mounting tube of a hitching arrangement. U.S. Pat. No. 4,704,883 to Dykes sets forth a kingpin lock preventing theft of a trailer by providing a lock structure to latch a sleeve relative to a kingpin of a trailer.

U.S. Pat. No. 4,067,213 to Little sets forth a truck trailer fifth wheel pin lock structure to obstruct mounting of a coupling of the trailer to a fifth wheel mounting.

U.S. Pat. No. 3,895,827 to Padrick sets forth a further example of a trailer fifth wheel lock to secure a trailer relative to an associated fifth wheel connection.

As such, it may be appreciated that there continues to be a need for a new and improved trailer security lock apparatus as set forth by the instant invention which addresses both the problems of ease of use as well as effectiveness in construction in providing an obstruction relative to a mounting sleeve of a fifth wheel trailer connection and in this respect, the present invention substantially fulfills this need.

SUMMARY OF THE INVENTION

In view of the foregoing disadvantages inherent in the known types of fifth wheel lock structure now present in the prior art, the present invention provides a trailer security lock apparatus wherein the same provides for a latch plate arranged for obstructing insertion of a latch member of a fifth wheel trailer mount. As such, the general purpose of the present invention, which will be described subsequently in greater detail, is to provide a new and improved trailer security lock apparatus which has all the advantages of the prior art trailer security lock apparatus and none of the disadvantages.

To attain this, the present invention provides a trailer lock structure arranged for use by fifth wheel trailers, wherein a mounting plate is fixedly secured to a trailer bottom wall forward end to receive fifth wheel securement linkage within a receiving cylindrical tube mounted orthogonally to the mounting plate extending therethrough. A latch plate is pivotally mounted to the cylindrical tube directed through a slot of the cylindrical tube and latched to effect an abutment within the cylindrical tube permitting undesirable removal over mounting of the structure to unauthorized individuals and associated vehicles. The use of support leg tubes for selectively receiving support legs therewithin permits the stable support of a forward end of an associated trailer.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved trailer security lock apparatus which has all the advantages of the prior art trailer security lock apparatus and none of the disadvantages.

It is another object of the present invention to provide a new and improved trailer security lock apparatus which may be easily and efficiently manufactured and marketed.

It is a further object of the present invention to provide a new and improved trailer security lock apparatus which is of a durable and reliable construction.

An even further object of the present invention is to provide a new and improved trailer security lock apparatus which is susceptible of a low cost of manufacture with regard to both materials and labor, and which accordingly is then susceptible of low prices of sale to the consuming public, thereby making such trailer security lock apparatus economically available to the buying public.

Still yet another object of the present invention is to provide a new and improved trailer security lock apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
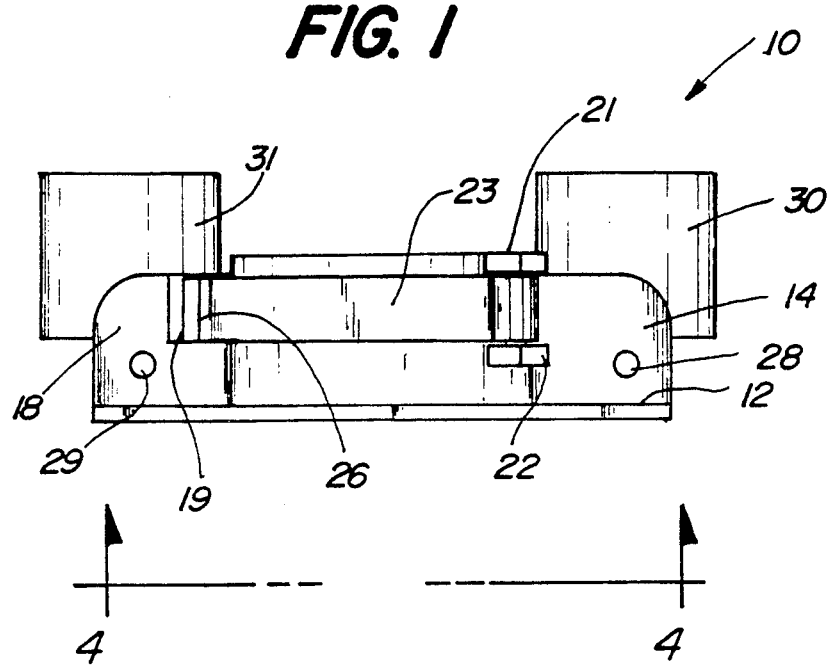
FIG. 1 is an orthographic end view of the instant invention.
Figure 2:
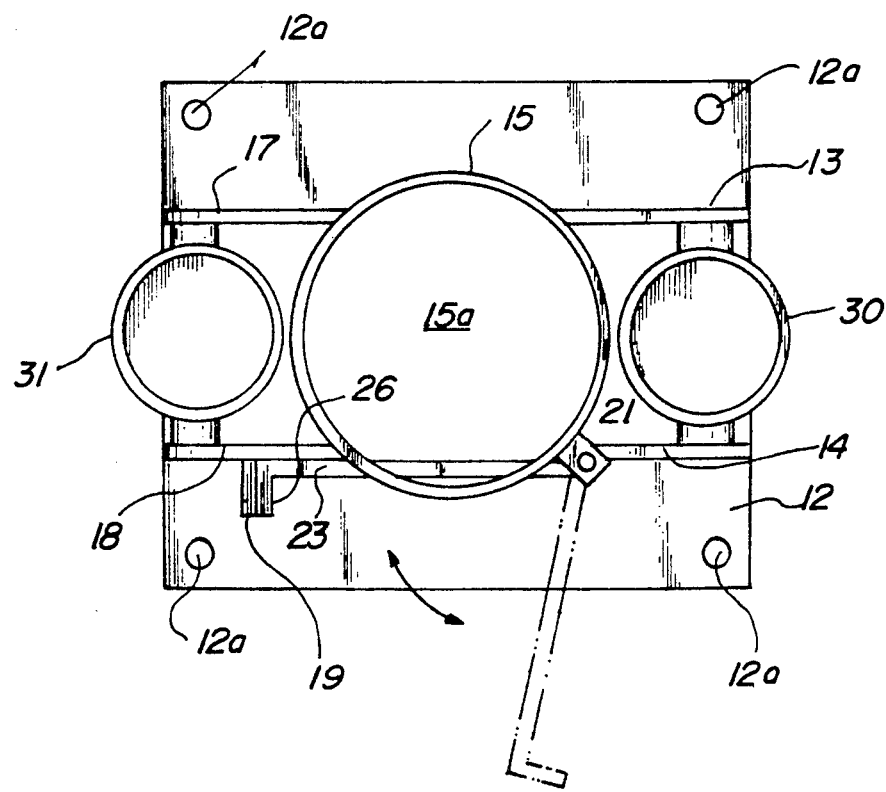
FIG. 2 is an orthographic top view of the instant invention.
Figure 3:
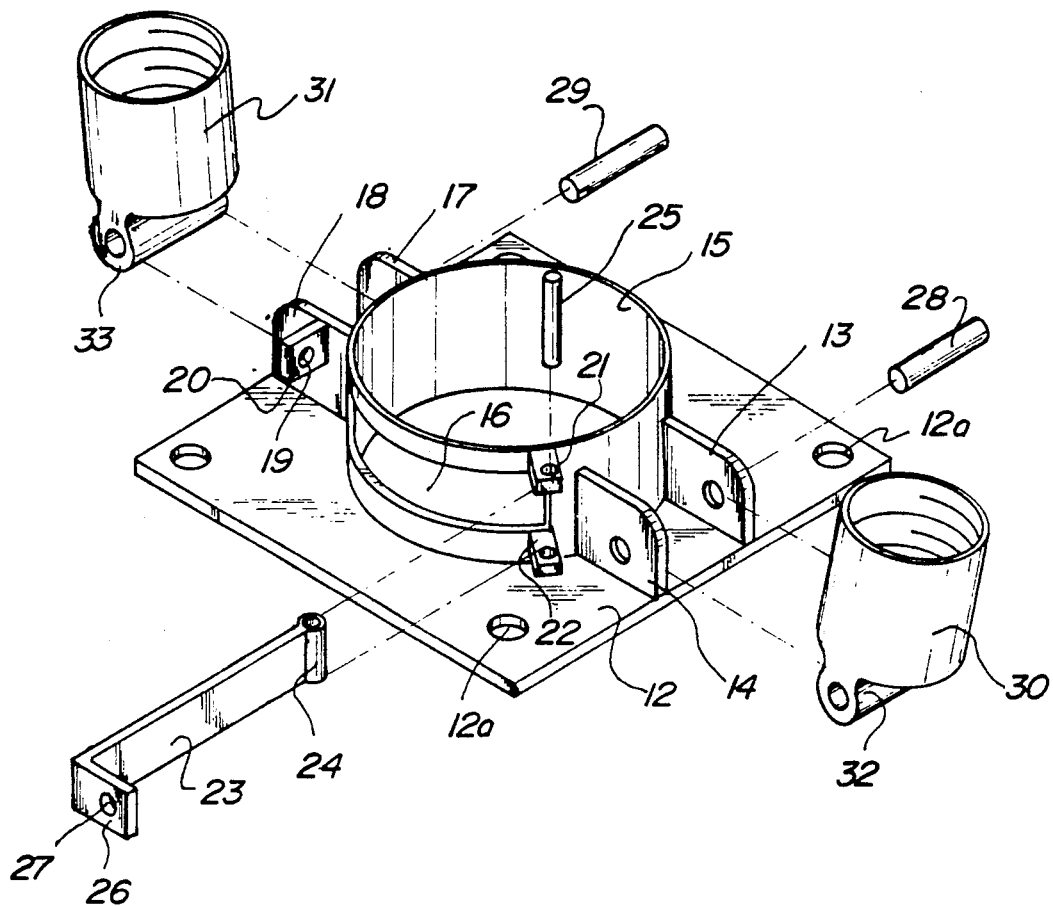
FIG. 3 is an isometric illustration, somewhat exploded for ease of illustration thereof.
Figure 4:
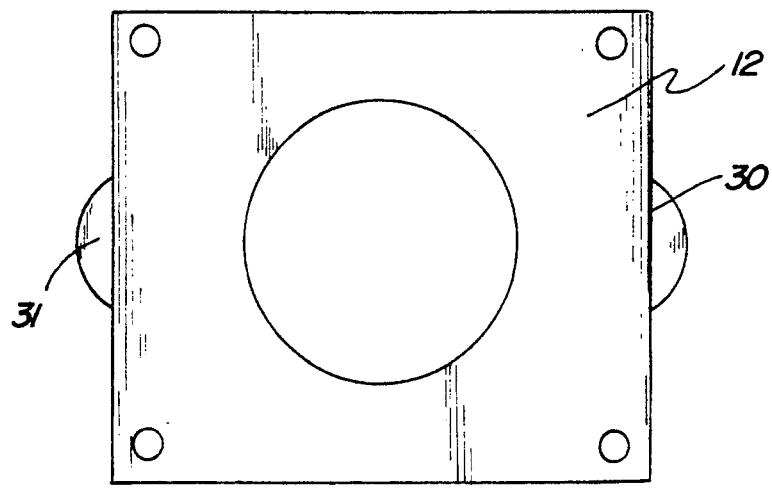
FIG. 4 is an orthographic bottom view of the instant invention.

With reference now to the drawings, and in particular to FIGS. 1 to 10 thereof, a new and improved trailer security lock apparatus embodying the principles and concepts of the present invention and generally designated by the reference numeral 10 will be described.

Figure 5:
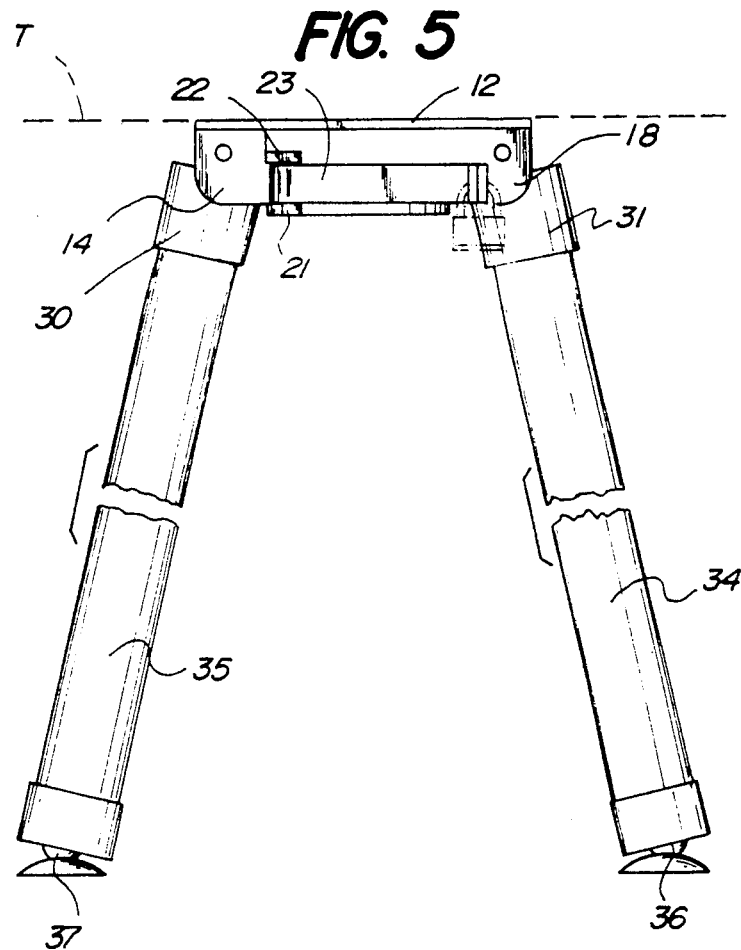
FIG. 5 is an orthographic side view of the invention incorporating support tubes for positioning of a trailer utilizing the invention.
Figure 6:
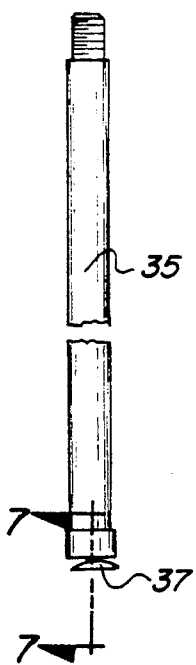
FIG. 6 is an orthographic view of one of the support tube structures utilized by the invention.
Figure 7:
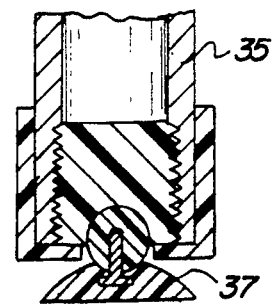
FIG. 7 is an orthographic view, taken along the lines 7—7 of FIG. 6 in the direction indicated by the arrows.
Figure 8:
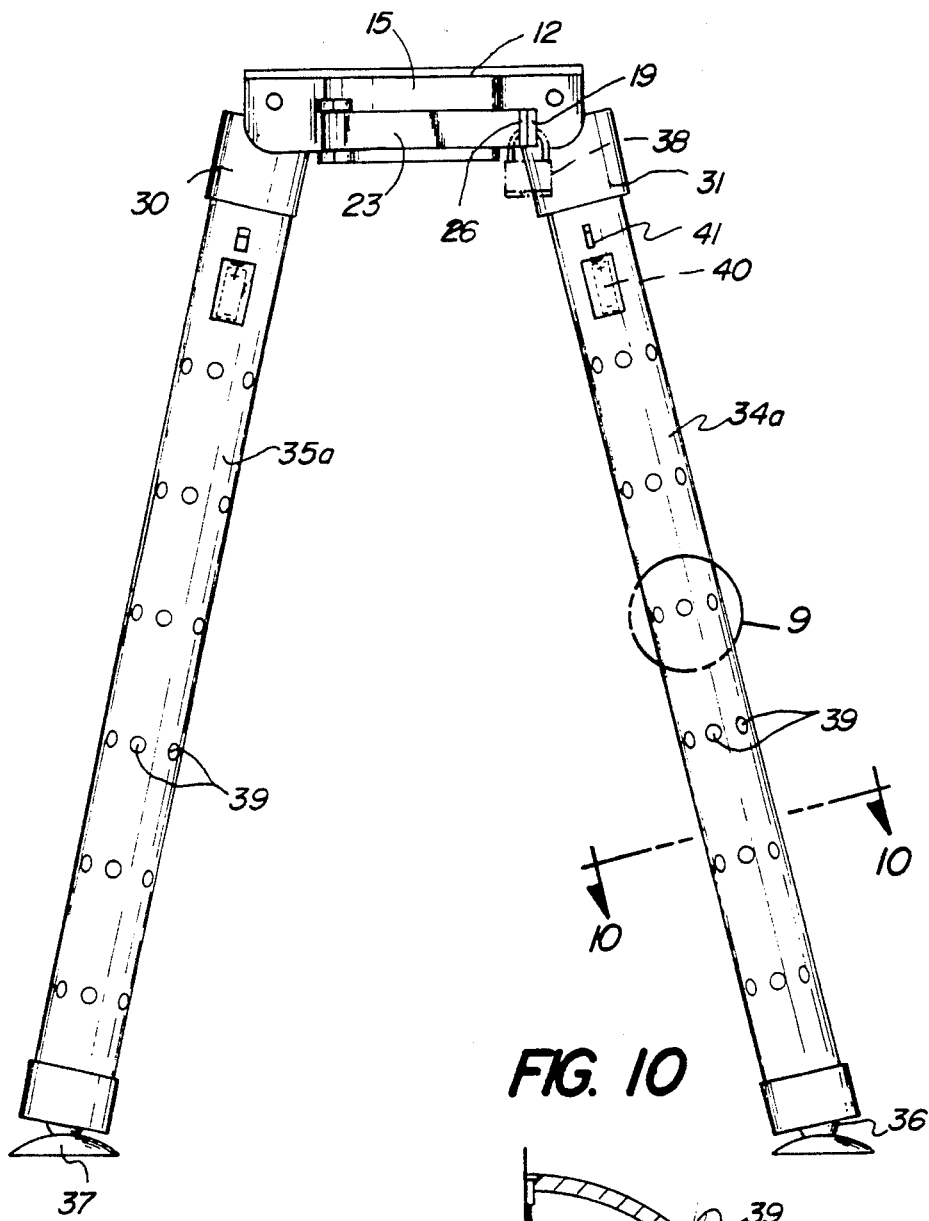
FIG. 8 is an orthographic view utilizing modified support tube structure.
Figure 9:
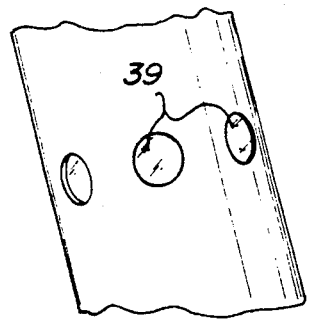
FIG. 9 is an enlarged orthographic view of section 9 as set forth in FIG. 8.
Figure 10:
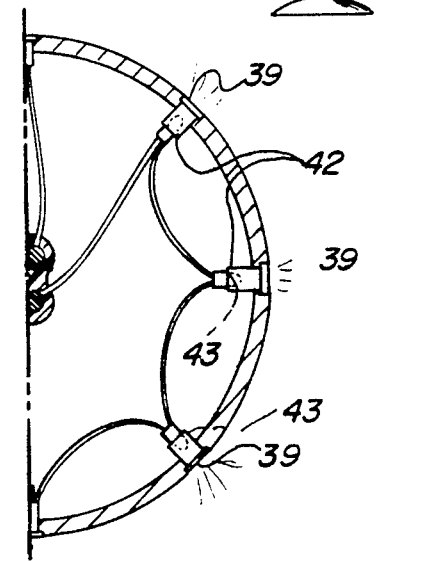
FIG. 10 is an orthographic view, taken along the lines 10—10 of FIG. 8 in the direction indicated by the arrows.

More specifically, the trailer security lock apparatus 10 of the instant invention essentially comprises a rigid mounting plate 12, including a plurality of plate bores 12a directed therethrough for fastening the mounting plate to a trailer bottom forward end portion "T", such as exemplified in FIG. 5, to orient the apparatus in an inverted configuration, such as illustrated in FIG. 5. A first plate flange 13 and a second plate flange 14 are orthogonally mounted to the plate 12 arranged in a parallel coextensive relationship relative to one another to a first side edge of the plate, with a third and fourth plate flange 17 and 18 that are coplanar with the first and second plate flanges 13 and 14 respectively and arranged and mounted to a second side edge of the mounting plate 12 orthogonally oriented relative to the plate 12. A trailer hitch receiving cylindrical tube 15, including a tube bore 15a directed therethrough, is orthogonally mounted medially of the mounting plate. The tube 15 includes a tube slot 16 oriented between the second and fourth plate flange 18 and through the wall of the cylindrical tube 15. A lock flange 19 is orthogonally mounted adjacent a forward end of the slot 16 and fixedly secured to the fourth plate flange 18, with the lock flange 19 including a lock flange bore 20 directed therethrough. An upper latch flange 21 and a lower latch flange 22 mounted to the cylindrical tube 15 adjacent the second plate flange 14 pivotally mounts a latch plate 23 therebetween about a latch plate axle 25 that is received through a latch plate hinge tube 24 formed within a rear distal end of the latch plate, with the hinge tube 24 coaxially aligned with the upper and lower latch flange members and their respective bores directed therethrough. A forward distal end of the latch plate 23 includes a latch plate lock plate 26 arranged for contiguous and coextensive communication with the lock flange 19 and includes a latch plate lock plate bore 27 that is coaxially aligned with the lock flange 19 when the latch plate 23 is in contiguous communication with the fourth plate flange 18 in the first position relative to a second position, such as illustrated in phantom in FIG. 2, displacing the latch plate 23 relative to the fourth plate flange 18. When the lock flange bore 20 and the latch plate lock plate bore 27 are coaxially aligned, a lock member 38 is arranged for reception therethrough, in a manner as typified in the FIG. 5 for example, to position the latch plate 23 within the tube bore 15a effecting abutment preventing for insertion of a mounting structure relative to a fifth wheel type of linkage preventing insertion of such linkage within the cylindrical tube 15.

A first tube axle 28 is orthogonally directed through the first and second plate bores 13 and 14, with a second tube axle 29 orthogonally directed the third and fourth plate flanges 17 and 18. A first support leg tube 30 and a second support leg tube 31 orthogonally mount first and second tube axle cylinders 32 and 33 respectively to the lower ends of the first and second support leg tubes 30 and 31. The first and second tube axle cylinders 32 and 33 each receive the respective first and second tube axles 28 and 29 therethrough to hingedly mount the first and second support leg tubes 30 and 31 relative to the mounting plate 12.

The FIG. 5 illustrates the use of respective first and second support tubes 34 and 35 mounted within respective first and second support leg tubes 30 and 31. The support tubes received within the support leg tubes each include a respective first and second tube swivel base 36 and 37 at a lower distal end thereof. A modified first and second support tube structure 34a and 35a, as illustrated in the FIG. 8, each includes a matrix of translucent lens members 39 directed through each of the support tubes 34a and 35a. A battery 40 contained within each support tube is cooperative and in electrical communication with an on/off switch 41 and with illumination bulbs 43, each contained within an illumination bulb housings 42 to effect selective illumination of the bulbs through the battery 40. Each of the illumination bulbs 43, as well as the illumination bulb housings 42 are fixedly mounted to the tubes in coaxial alignment with the associated translucent lens members 39 to provide for illumination of the apparatus during evening hours to afford better visibility as to the orientation of the structure during periods of storage of the associated trailer structure.

As to the manner of usage and operation of the instant invention, the same should be apparent from the above disclosure, and accordingly no further discussion relative to the manner of usage and operation of the instant invention shall be provided. For example, the base 12 may be of any desired configuration, such as circular.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A trailer security lock apparatus for securement to a bottom wall of a trailer member, wherein the apparatus comprises, a mounting plate, the mounting plate including a cylindrical tube orthogonally directed medially of the mounting plate,
and
a slot directed through the cylindrical tube, with the cylindrical tube including a tube bore directed therethrough, with the slot in communication with the tube bore,
and
a plate member removably mounted relative to the slot for projection into the slot and into the tube bore for providing an abutment within the tube bore,
and
a first plate flange and a second plate flange orthogonally mounted to a top surface of the mounting plate integrally mounted to the cylindrical tube and the top surface of the mounting plate and each extending to a first side of the mounting plate, wherein the first plate flange and the second plate flange are arranged in a parallel coextensive relationship relative to one another, and a third plate flange and a fourth plate flange integrally mounted to the mounting plate to the top surface thereof diametrically opposed to the first plate flange and the second plate flange and integrally mounted to the cylindrical tube and the mounting plate and extending to a second side of the mounting plate, with the third flange coplanar with the first plate flange and the fourth plate flange coplanar with the second plate flange, and the third plate flange and the fourth plate flange arranged in a parallel coextensive relationship relative to one another, and a first support leg tube pivotally mounted between the first plate flange and the second plate flange and a second support leg tube pivotally mounted between the third plate flange and the fourth plate flange.

2. An apparatus as set forth in claim 1 wherein the plate means includes an upper latch flange and a lower latch flange mounted adjacent a first side of the slot, with the plate means further including a latch plate, the latch plate including a first end, the first end including a hinge tube, the hinge tube received between the upper latch flange and the lower latch flange, and a hinge tube axle directed through the upper latch flange and the lower latch flange and the hinge tube, and the latch plate including a forward end, the forward end including a latch plate lock orthogonally mounted to the latch plate at the forward end thereof, and a lock flange mounted to a forward end of the slot spaced from the upper latch flange and the lower latch flange, with the lock flange arranged in a parallel relationship relative to the latch plate lock plate, the latch plate lock plate including a latch plate lock plate bore and the lock flange including a lock flange bore, with the lock flange bore and the latch plate lock plate bore coaxially aligned when the lock flange and the latch plate are in a first position with the latch plate received within the slot, and a lock member arranged for projection through the lock flange bore and the latch plate lock plate bore.

3. An apparatus as set forth in claim 2 wherein the first support leg tube includes a first tube axle cylinder integrally mounted to a bottom surface of the first support leg tube orthogonally oriented relative to the first support leg tube, and the second support leg tube including a second tube axle cylinder orthogonally and integrally mounted to the bottom surface of the second support leg tube, and a first tube axle orthogonally directed through the first plate flange and the second plate flange and the first tube axle cylinder, and a second tube axle orthogonally directed through the third plate flange and the fourth plate flange and through the second tube axle cylinder.

4. An apparatus as set forth in claim 3 including a first support tube received within the first support leg tube, and a second support tube received within the second support leg tube, the first support tube includes a first tube swivel boss at a lower distal end of the first support tube spaced from the first support leg tube, and the second support tube includes a second tube swivel boss mounted at a lower distal end of the second support tube spaced from the second support leg tube.

5. An apparatus as set forth in claim 4 wherein the first support tube and the second support tube include a matrix of translucent lens members directed through each of the first and second support tubes, and each of the support tubes includes a battery contained therewithin, and an on/off switch in electrical communication with a battery, and each of the translucent lens members includes an illumination bulb housing positioned rearwardly of each translucent lens member within the support tubes, and an illumination bulb contained within each illumination bulb housing in electrical communication with the on/off switch and the battery to effect selective illumination of the illumination bulbs.

* * * * *